US010197721B2

(12) United States Patent
Ikuta

(10) Patent No.: US 10,197,721 B2
(45) Date of Patent: ***Feb. 5, 2019

(54) ILLUMINATION DEVICE, DISPLAY DEVICE, AND TELEVISION RECEPTION DEVICE

(71) Applicant: Sharp Kabushiki Kaisha, Osaka (JP)

(72) Inventor: Kaori Ikuta, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 115 days.

This patent is subject to a terminal disclaimer.

(21) Appl. No.: 14/901,958

(22) PCT Filed: Jun. 27, 2014

(86) PCT No.: PCT/JP2014/067149
§ 371 (c)(1),
(2) Date: Dec. 29, 2015

(87) PCT Pub. No.: WO2015/002083
PCT Pub. Date: Jan. 8, 2015

(65) Prior Publication Data
US 2016/0274297 A1    Sep. 22, 2016

(30) Foreign Application Priority Data
Jul. 5, 2013    (JP) .................................. 2013-141552

(51) Int. Cl.
*H04N 5/50* (2006.01)
*H04N 5/64* (2006.01)
(Continued)

(52) U.S. Cl.
CPC ............. *G02B 6/0088* (2013.01); *G02B 6/00* (2013.01); *G02B 6/005* (2013.01); *G02B 6/0031* (2013.01);
(Continued)

(58) Field of Classification Search
CPC ........................................................ H04N 5/50
(Continued)

(56) References Cited

U.S. PATENT DOCUMENTS 9,244,215 B2 *   1/2016   Gettemy .............. G02B 6/0031
2002/0063814 A1   5/2002   Kasuga et al.
(Continued)

FOREIGN PATENT DOCUMENTS

| JP | 2002-169152 A | 6/2002 |
| WO | 2011/043140 A1 | 4/2011 |
| WO | 2013/069371 A1 | 5/2013 |

*Primary Examiner* — Brian P Yenke
*Assistant Examiner* — Justin B Sanders
(74) *Attorney, Agent, or Firm* — ScienBiziP, P.C.

(57) ABSTRACT

An illumination device includes: a light source; a light guide plate, at least one side face thereof being a light-entering face where light from the light source enters and one surface thereof being a light-exiting surface where light from the light source exits; and a frame-shaped member having a frame shape and including a pressing portion extending inwardly in a plan view and pressing an edge of the light-exiting surface of the light guide plate from above in a side view, an end face of the pressing portion facing inwardly and being exposed to the light-exiting surface thereunder, wherein at least part of the end face of the pressing portion has light-reflecting characteristics and has an inclined surface directed towards the light-exiting surface.

15 Claims, 13 Drawing Sheets

(51) Int. Cl.
*F21V 8/00* (2006.01)
*G02B 6/00* (2006.01)

(52) U.S. Cl.
CPC ......... *G02B 6/0081* (2013.01); *G02B 6/0091* (2013.01); *H04N 5/50* (2013.01); *G02B 6/0055* (2013.01); *H04N 5/64* (2013.01)

(58) Field of Classification Search
USPC .......................................................... 348/731
See application file for complete search history.

(56) References Cited

U.S. PATENT DOCUMENTS

| | | | |
|---|---|---|---|
| 2010/0135003 A1* | 6/2010 | Huang | G02F 1/133608 362/97.2 |
| 2011/0085107 A1* | 4/2011 | Noh | G02B 6/0085 349/61 |
| 2012/0092562 A1* | 4/2012 | Omiya | H04N 5/64 348/725 |
| 2012/0188465 A1 | 7/2012 | Ohyama | |
| 2012/0257417 A1* | 10/2012 | Lee | G02B 6/005 362/622 |

* cited by examiner

ILLUMINATION DEVICE, DISPLAY DEVICE, AND TELEVISION RECEPTION DEVICE

TECHNICAL FIELD

The present invention relates to an illumination device, a display device and a television receiver.

BACKGROUND ART

For example, a liquid crystal display device such as a liquid crystal television requires a separate backlight device as an illumination device since the display panel thereof, which is a liquid crystal panel, does not emit light. Such backlight devices are broadly classified as direct-lit backlight devices and edge-lit backlight devices in accordance with the structures thereof. In order to achieve a further reduction in the thickness of the liquid crystal display device, it is preferable to use an edge-lit backlight device.

In such an edge-lit backlight device, a light guide plate that guides light that has been emitted from light sources such as light-emitting diodes (LEDs) toward a light-exiting surface provided at one surface of the light guide plate is housed inside a casing. Since members such as optical sheets and a liquid crystal panel are arranged on the light-exiting-surface side of the light guide plate, a member is needed to support the edges of these members.

Patent Document 1 discloses a backlight device in which the edges of members such as optical sheets are supported in this way. In this backlight device, the edges of optical sheets and the edges of a liquid crystal panel are supported by a backlight chassis arranged so as to surround the light guide plate. Consequently, in this backlight device, the optical sheets and the liquid crystal panel are supported outside of the light-exiting surface of the light guide plate.

RELATED ART DOCUMENT

Patent Document

Patent Document 1: Japanese Patent Application Laid-Open Publication No. 2002-169152

Problems to be Solved by the Invention

In a backlight device, narrowing of a frame region of the backlight device, so called frame narrowing, may be required for design reasons. However, in the backlight device of Patent Document 1 listed above, it would be difficult to make the frame region narrow since the edges of the optical sheets and the liquid crystal panel need to be supported outside of the light guide plate.

On the other hand, if an attempt were made to make the frame region narrow by supporting the edges of the optical sheets and the liquid crystal panel at positions superimposed with the edges of the light guide plate in the backlight device, it would be necessary to arrange a frame-shaped member for supporting the optical sheets and the liquid crystal panel so as to be superimposed with the edges of the light-exiting surface of the light guide plate. In such a case, the inner edges of the frame-shaped member would protrude toward a display region of a display surface and the protruding parts might be displayed as a shadow on the display surface or light from the light-exiting surface could be scattered at the protruding parts and as a result might be displayed as bright spots on the display surface.

SUMMARY OF THE INVENTION

The technology disclosed in the present specification was made in view of the above-mentioned problem. In the present specification, an objective is to provide a technology that is able to prevent or suppress generation of shadows or bright spots on a display surface while making a frame region narrow.

Means for Solving the Problems

A technology disclosed in the present specification relates to an illumination device that includes: a light source; a light guide plate, at least one side face thereof being a light-entering face where light from the light source enters and one surface thereof being a light-exiting surface where light from the light source exits; and a frame-shaped member having a frame shape and including a pressing portion extending inwardly in a plan view and pressing an edge of the light-exiting surface of the light guide plate from above in a side view, an end face of the pressing portion facing inwardly and being exposed surface exposed to the light-exiting surface thereunder, wherein at least part of the end face of the pressing portion has light-reflecting characteristics and has an inclined surface directed towards the light-exiting surface.

When the frame region has been made narrow in an illumination device, the exposed portion (the end face of the pressing portion) of the frame-shaped member protrudes toward a display region of a display surface and overlaps the display region. Consequently, there is a risk of light that has exited the light-exiting surface being blocked by the exposed surface of the exposed portion and a shadow being formed on the display surface, or of the light being scattered by the exposed surface and a bright spot being formed on the display surface. In contrast, in the above-described illumination device, since at least part of the exposed surface of the exposed portion overlapping the display region has optical reflectivity, it is possible to prevent light that has exited the light-exiting surface from being blocked by the exposed surface when the frame region has been made narrow. In addition, since at least part of the exposed surface is an inclined surface that is oriented toward the light-exiting surface, the majority of light that is scattered by the exposed surface heads away from the display surface and toward the center of the light-exiting surface and the generation of bright spots on the display surface can be prevented or suppressed even when the frame region has been made narrow. With the above-described illumination device, it is possible to prevent or suppress the generation of shadows or bright spots on the display surface while making the frame region narrow.

The illumination device may further include an optical sheet that exerts an optical effect on light that exits the light-exiting surface of the light guide plate, and a top surface of the pressing portion may support an edge of the optical sheet.

With this configuration, the frame-shaped member can be made to also serve as a member for supporting the optical sheet. Furthermore, the light guide plate and the optical sheet are separated from each other as a result of the frame-shaped portion being interposed between the light guide plate and the optical sheet, and therefore light that has exited the light-exiting surface can be allowed to diffuse before reaching the optical sheet and the brightness distribution of the light can be improved.

The at least part of the end face of the pressing portion may have a curved shape that is recessed towards an inside of the exposed portion.

With this configuration, compared with the case where the exposed surface is a flat inclined surface, light scattered by the exposed surface can be directed more toward the light-exiting surface.

The at least part of the end face of the pressing portion may bulge outward from the exposed portion.

With this configuration, compared with the case where the exposed surface is a flat inclined surface, light scattered by the exposed surface can be directed more toward the light-exiting surface.

The pressing portion of the frame-shaped member may include a first member having the end face, and the first member may be attached to a remaining structure of the frame-shaped member.

With this configuration, in the process of manufacturing the illumination device, the exposed member, which includes the exposed portion of the frame-shaped member, can be attached as a member that is separate to the part of the frame-shaped member other than the exposed portion. In addition, the convenience of member replacement can be made high since only the exposed member need be replaced if a defect is found in the exposed surface after the exposed member is attached to the frame-shaped member.

The pressing portion of the frame-shaped member may include a reflective member that has light-reflective characteristics and that is attached to a remaining structure of the frame shaped member, the remaining structure of the frame shaped member being made of a material having light-shielding characteristics.

With this configuration, since the part of the frame-shaped member other than the exposed surface has a light-blocking property, leaking of light from the light source or light guide plate to outside the frame-shaped member can be effectively prevented.

In the end face of the pressing portion, the at least part of the end face having the inclined surface may be located in a position corresponding to the light source.

With this configuration, parts of the exposed surface that are not an inclined surface can be made to function as parts that press the edge of the light guide plate. Therefore, compared with the case where the entirety of the exposed surface is an inclined surface, the light-exiting surface of the light guide plate can be more easily held in place and the light guide plate can be more stably arranged.

The edge of the light-exiting surface that is pressed by the pressing portion of the frame-shaped member may be at a side of the light-entering face of the light guide plate.

The majority of the light exits the light-exiting surface from the portion of the light-exiting surface close to the light-entering face. Therefore, a greater amount of light exits at the edge of the light-exiting surface positioned on the light-entering face side among the edges of the light-exiting surface than at the edges not positioned on the light-entering face side. Consequently, with this configuration, the generation of shadows and bright spots on the display surface can be effectively prevented or suppressed.

The end face of the pressing portion may be colored white.

Thus, a specific configuration of the inclined surface having optical reflectivity can be provided.

The light source may be arranged so as to face the light-entering face of the light guide plate, and the frame-shaped member may be arranged such that a part of the frame-shaped member from which the pressing portion extends inwardly covers a gap between the light source and the light-entering face from above.

With this configuration, light from the light source can be prevented from leaking toward the display surface side without being guided by the light guide plate.

A technology disclosed in the present specification can be expressed as a display device including: the illumination device; and a display panel that performs display utilizing light from the illumination device.

In the display device, the frame-shaped member may include a panel-supporting portion having a panel-supporting surface that supports the display panel.

With this configuration, the frame-shaped member can be made to also serve as a member for supporting the display panel.

In the display device, only a part of the inclined surface at the end face of the pressing portion protrudes toward a display region of a display surface of the display panel in a plan view.

With this configuration, the width of the part that protrudes into the display region AA out of the exposed portion of the frame-shaped member when a frame region of the display device has been made narrow is smaller than in the case where a conventional frame is used. Accordingly, compared with the conventional configuration, it can be made less likely that the protruding part will cast a shadow when the display region AA is viewed obliquely.

As the display device, a display device in which the display panel is a liquid crystal panel employing liquid crystal is novel and useful. Furthermore, a television receiver including the display device is novel and useful.

Effects of the Invention

According to the technology disclosed in the present specification, it is possible to prevent or suppress generation of shadows and bright spots on a display surface while making a frame region narrow.

DETAILED DESCRIPTION OF EMBODIMENTS

Embodiment 1

Figure 1:
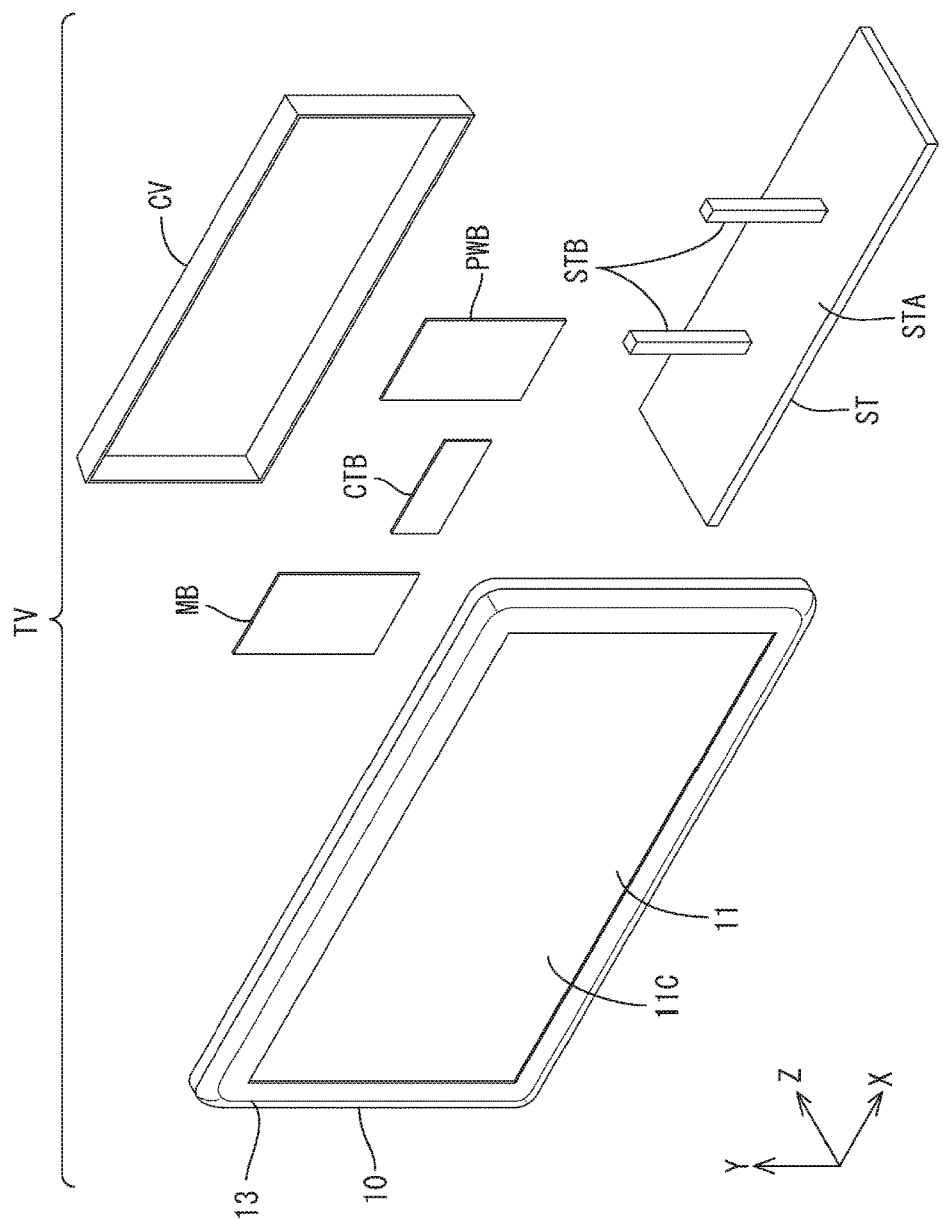
FIG. 1 is an exploded perspective view of a television receiver according to Embodiment 1.

Embodiment 1 will be described while referring to the drawings. In this embodiment, a liquid crystal display device (example of display device) 10 will be exemplified. Each of the drawings indicates an X axis, a Y axis, and a Z axis in a portion of the drawings, and each of the axes indicates the same direction for the respective drawings. The Y axis direction corresponds to the vertical direction, and the X axis direction corresponds to the horizontal direction. Unless otherwise noted, "up" and "down" in the description is based on the vertical direction.

Figure 3:
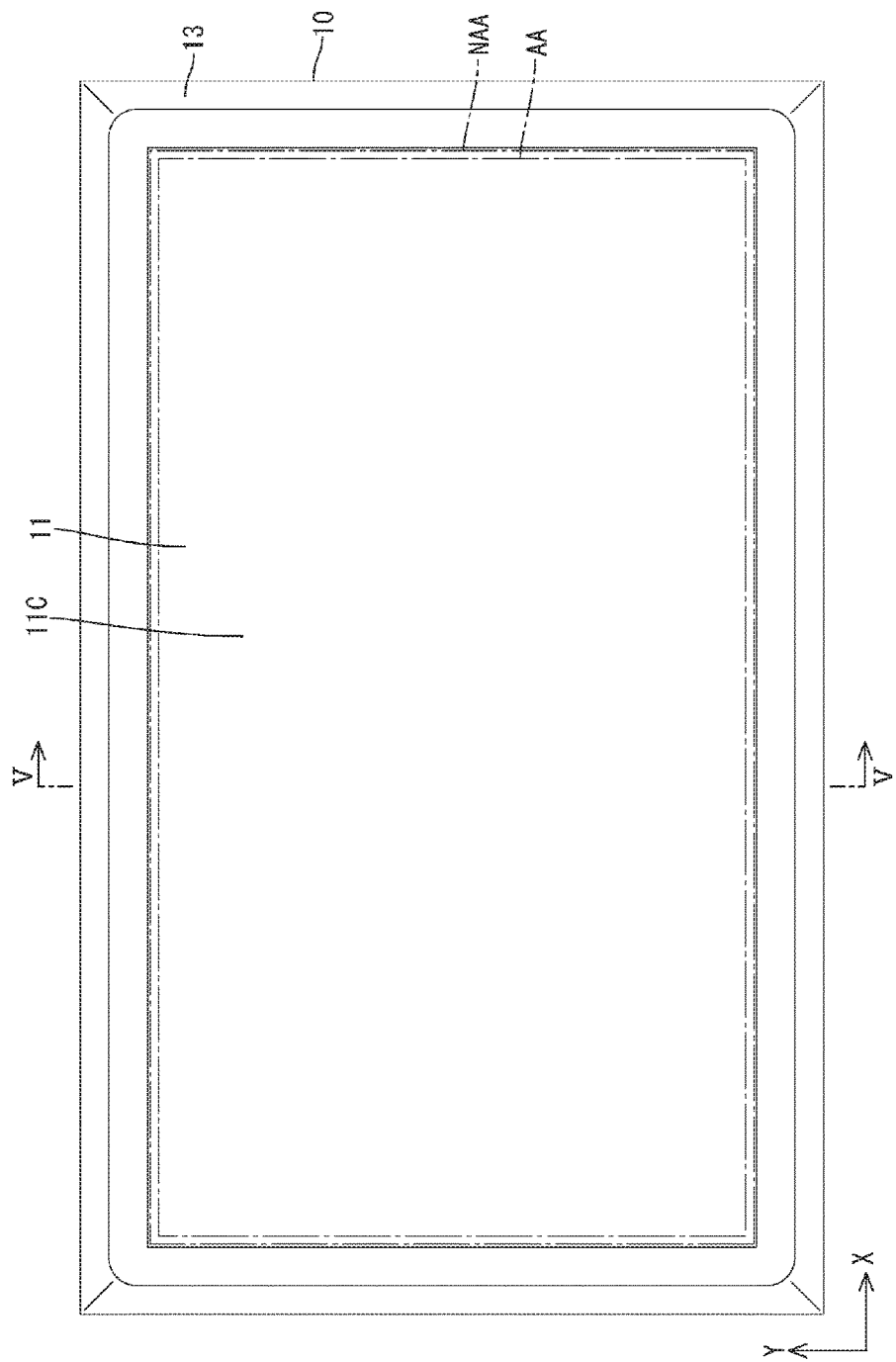
FIG. 3 is a plan view of the liquid crystal display device.

As shown in FIG. 1, a television receiver TV according to this embodiment includes a liquid crystal display device 10, various boards PWB, MB and CTB attached to a back-surface side (rear-surface side) of the liquid crystal display device 10, a cover member CV that is attached to the back-surface side of the liquid crystal display device 10 so as to cover the various boards PWB, MB and CTB, and a stand ST. The television receiver TV is supported by the stand ST in a state where a display surface of the liquid crystal display device 10 is substantially parallel to the Y axis direction (vertical direction). As shown in FIG. 3, the liquid crystal display device 10 has a horizontally-long quadrangular shape (rectangular shape) as a whole and, thereinside, a liquid crystal panel (example of display panel) 11, which has a display surface 11C that displays an image, and a backlight device (example of illumination device) 12, which is an external light source, are interposed between a pair of cabinets 13 and 14. Among the pair of cabinets 13 and 14, a cabinet exposed at the front-side of the liquid crystal display device 10 is a front cabinet 13 and a cabinet exposed at the back-side of the liquid crystal display device 10 is a rear cabinet 14.

Figure 2:
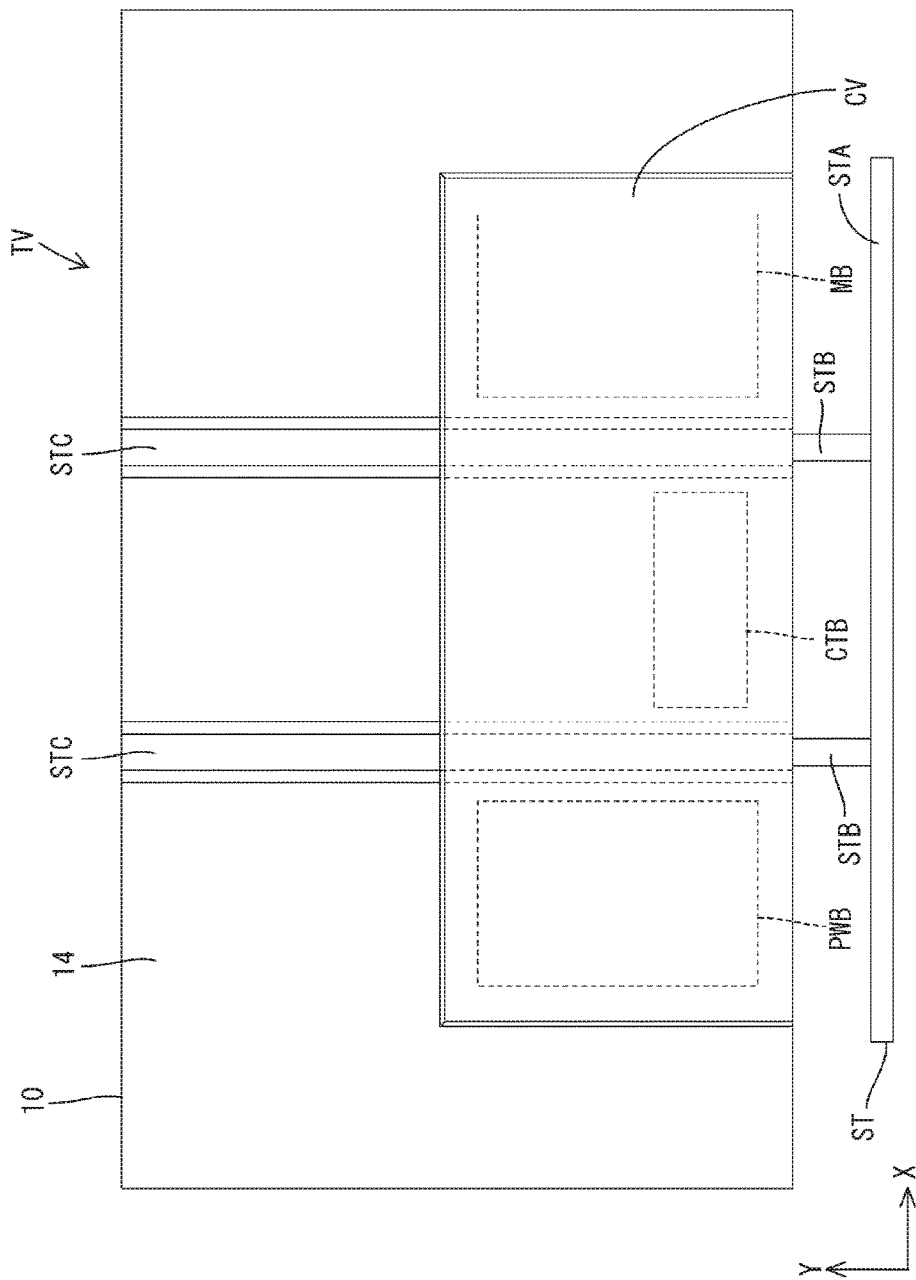
FIG. 2 is a rear view of the television receiver and a liquid crystal display device.

First, the configuration of the back-surface side of the liquid crystal display device 10 will be described. As shown in FIG. 2, a pair of stand attachment members STC that extend in the Y axis direction are attached to the back surface of the rear cabinet 14, which forms the exterior of the back side of the liquid crystal display device 10, at two positions that are spaced apart from each other in the X axis direction. The cross-sectional shape of these stand attachment members STC is a substantially channel-like shape in which a surface on the rear cabinet 14 side is open, and a pair of columnar supports STB of the stand ST are inserted into the inside of spaces between the stand attachment members STC and the rear cabinet 14. The stand ST includes a pedestal STA that extends parallel to the X axis direction and the Z axis direction and the pair of columnar supports STB that stand upright from the pedestal STA and extend along the Y axis direction. The cover member CV is formed of a synthetic resin and is attached so as to cover part of the back surface of the rear cabinet 14, specifically, approximately the lower half of the back surface of the rear cabinet 14 as shown in FIG. 2 while crossing the pair of stand attachment members STC in the X axis direction. A component housing space in which components such as the various boards PWB, MB and CTB, which will be described next, can be housed is secured between the cover member CV and the rear cabinet 14.

As shown in FIG. 2, the various boards PWB, MB and CTB include a power supply board PWB, a main board MB and a control board CTB. The power supply board PWB supplies power to the liquid crystal display device 10 and is also capable of supplying driving power to the other boards MB and CTB and LEDs (example of light source) 24 of a backlight device 12 for example. Therefore, the power supply board PWB also serves as an LED driving board that drives the LEDs 24. The main board MB includes at least a tuner unit that is able to receive a television signal and an image processing unit (neither unit is shown) that subjects a received television signal to image processing and is able to output a processed image signal to the control board CTB, which will be described later. When the liquid crystal display device 10 is connected to an external image reproduction device, which is not shown, the main board MB is input with an image signal from the image reproduction device and therefore is able to subject the image signal to image processing using the image processing unit and output the processed image signal to the control board CTB. The control board CTB has a function of converting an image signal input from the main board MB into a liquid crystal driving signal and supplying the liquid crystal driving signal obtained through this conversion to the liquid crystal panel 11.

Figure 4:
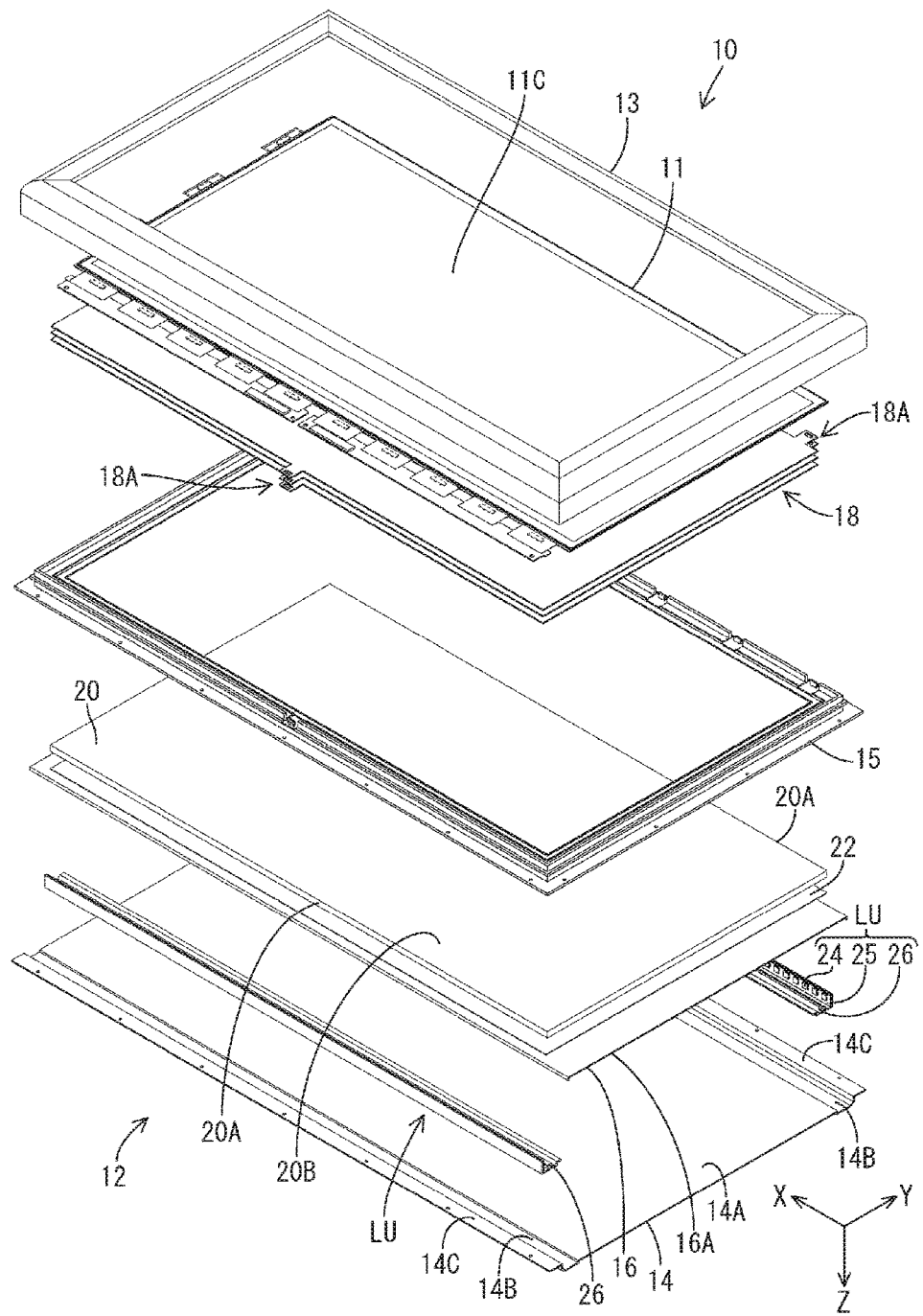
FIG. 4 is an exploded perspective view of the liquid crystal display device.
Figure 5:
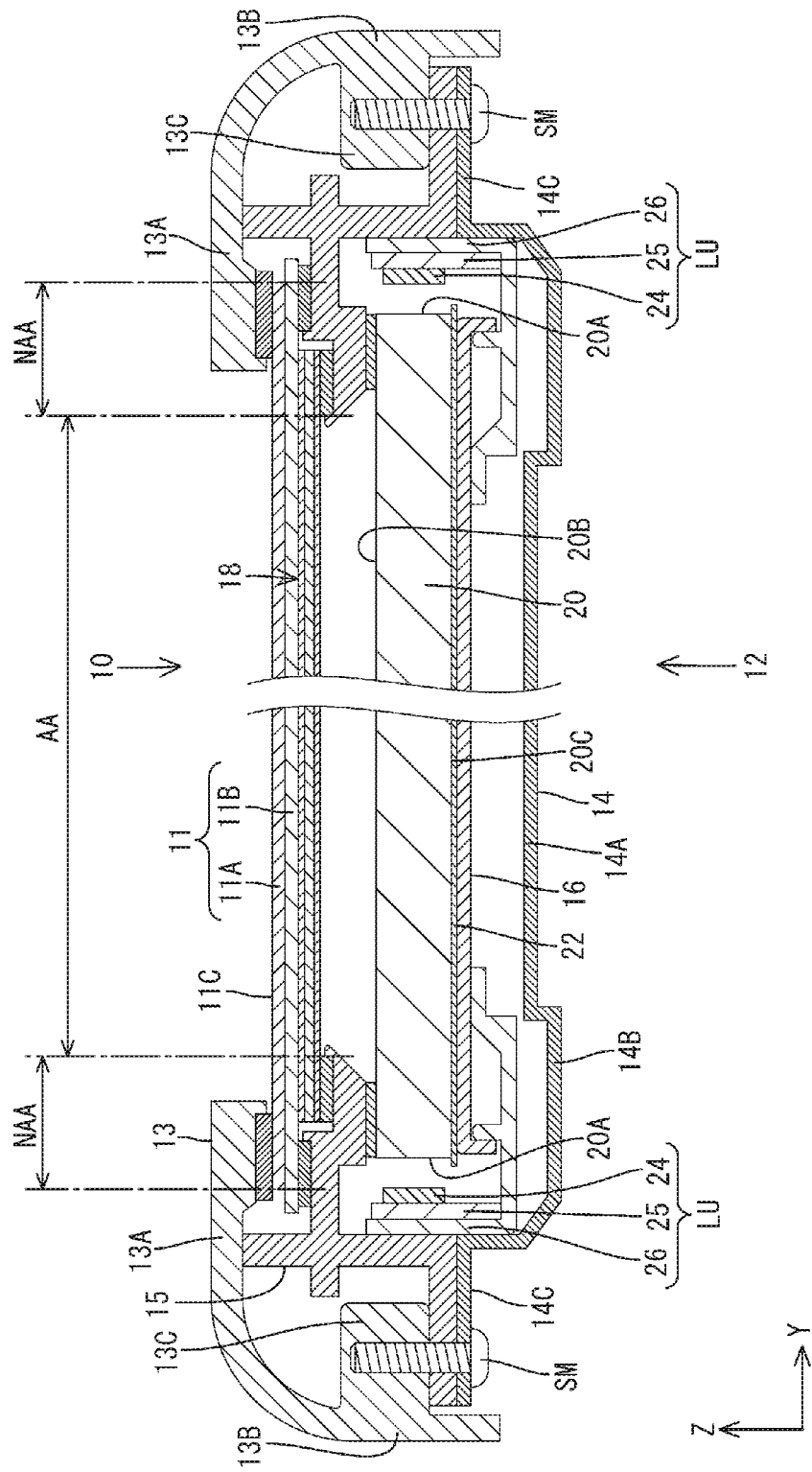
FIG. 5 is a sectional view of a cross section obtained by cutting the liquid crystal display device along a short-side direction.

As shown in FIG. 3, the liquid crystal panel 11 has a rectangular shape (oblong shape) in a plan view. A substantially frame-shaped region, which forms an outer periphery of the display surface 11C, of the display surface 11C of the liquid crystal panel 11 is a non-display region NAA that does not display an image. On the other hand, a region, which is surrounded by the non-display region NAA, of the display surface 11C of the liquid crystal panel 11 is a display region AA that displays an image. In addition, as shown in FIGS. 4 and 5, the liquid crystal panel 11 has a configuration in which a pair of glass substrates 11A and 11B having excellent transparency are adhered to each other with a prescribed gap therebetween and liquid crystal is enclosed between the substrates 11A and 11B. The liquid crystal panel 11 is arranged so as to be stacked on optical sheets 18, which will be described later. The substrate at the front side (front-surface side) among the pair of substrates 11A and 11B is a CF substrate 11A and the substrate at the back-side (rear-surface side) is an array substrate 11B. Among these substrates, the array substrate 11B is provided with switching elements (for example, TFTs) connected to source wiring lines and gate wiring lines, which orthogonally cross each other; pixel electrodes connected to the switching elements; and an alignment film. In contrast, the CF substrate 11A is, for example, provided with a color filter in which colored portions of red (R), green (G), blue (B), etc. are arranged in a certain arrangement, an opposite electrode, and an alignment film. A polarizing plate (not shown) is arranged on the outside of both the substrates 11A and 11B.

Figure 6:
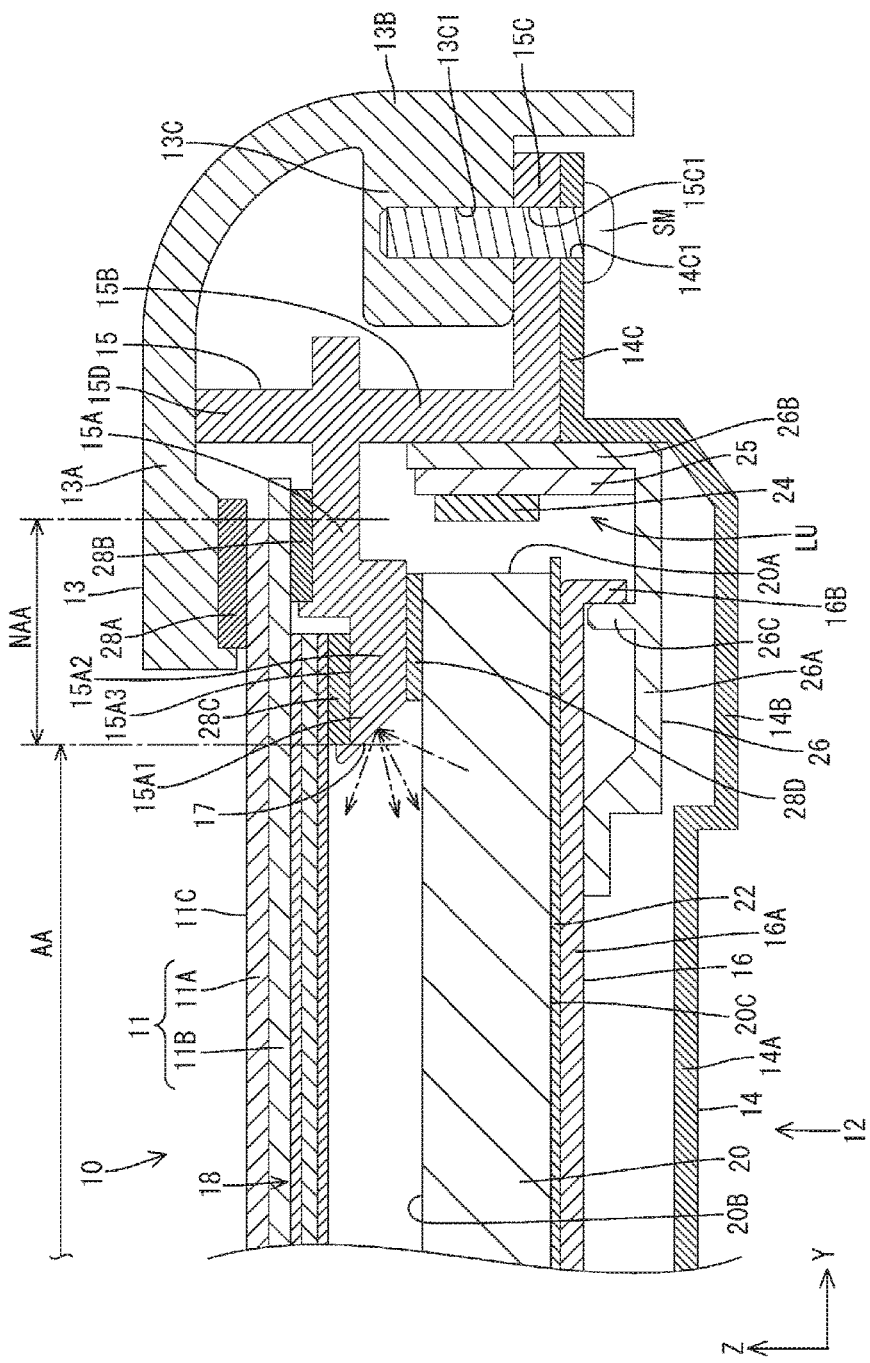
FIG. 6 is an enlarged sectional view of an important part of FIG. 5.

Among the pair of substrates 11A and 11B forming the liquid crystal panel 11, the array substrate 11B is arranged so as to protrude more outward than the CF substrate 11A, as shown in FIGS. 5 and 6. In more detail, the array substrate 11B is formed so as to be slightly larger than the CF substrate 11A in order that the entirety of the outer periphery of the array substrate 11B protrudes toward the outside from the outer periphery of the CF substrate 11A. A plurality of terminals to which the gate wiring lines and the source wiring lines are led out are provided at one long-side edge of the array substrate 11B and a flexible substrate on which a liquid-crystal-driving driver is mounted is connected to these terminals. Signals from the control board CTB are supplied to these terminals via the flexible substrate and as a result an image is displayed on the display surface 11C of the liquid crystal panel 11.

The front cabinet 13 presses the liquid crystal panel 11 from the front side and forms a front-side exterior of the liquid crystal display device 10. The front cabinet 13 is formed of a metal such as aluminum and has higher mechanical strength (rigidity) and thermal conductivity than if the cabinet were formed of a synthetic resin. As shown in FIG. 3, the front cabinet 13 has a horizontally-long frame-like shape on the whole that surrounds the display region of the display surface 11C of the liquid crystal panel 11. The front cabinet 13 includes a panel-pressing portion 13A that extends parallel to the display surface 11C of the liquid crystal panel 11 and presses the liquid crystal panel 11 from the front side, and a side wall portion 13B that protrudes from an outer peripheral part of the panel pressing portion 13A toward the back side. The front cabinet 13 has a substantially L-shaped cross-sectional shape in which a boundary portion between the panel-pressing portion 13A and the side wall portion 13B bends in a curved shape.

The panel-pressing portion 13A of the front cabinet 13 has a horizontally-long frame-like shape similar to the outer peripheral edge (non-display region NAA) of the liquid crystal panel 11 and is able to press almost the entirety of the outer peripheral edge of the liquid crystal panel 11 from the front side. A cushioning member 28A is provided between the panel-pressing portion 13A and the liquid crystal panel 11 (refer to FIG. 6). An outer surface, which faces the front side, of the panel-pressing portion 13A (surface on opposite side to surface that opposes liquid crystal panel 11) is exposed to the outside at the front side of the liquid crystal display device 10 similarly to the display surface 11C of the liquid crystal panel 11 and forms the front surface of the liquid crystal display device 10 together with the display surface 11C of the liquid crystal panel 11.

The side wall portion 13B of the front cabinet 13 has a substantially rectangular cylindrical shape that protrudes toward the back side from the outer peripheral edge of the panel-pressing portion 13A. The side wall portion 13B surrounds the entirety of the backlight device 12. The outer surface of the side wall portion 13B, the outer surface extending along the direction of the periphery of the liquid crystal display device 10, is exposed to the outside along the direction of periphery of the liquid crystal display device 10 and forms a top surface, a bottom surface and both side surfaces of the liquid crystal display device 10. As shown in FIG. 6, a screw attachment portion 13C, to which screw members SM are attached from the back side, is integrally formed with the inner surface of the side wall portion 13B. The screw attachment portion 13C has a substantially block-like shape that protrudes toward the inside (toward light guide plate 20 to be described later) from the inner surface of the side wall portion 13B. The screw attachment portion 13C is able to sandwich part of a frame 15 between the screw attachment portion 13C and the rear cabinet 14 arranged on the back side of the liquid crystal display device 10 and these members can be held together by the screw members SM attached to the rear cabinet 14 from the back side. In addition, front-side-cabinet screw holes 13C1 that open toward the back side and can fix the screw members SM in place are formed in the screw attachment portion 13C (refer to FIG. 6).

The rear cabinet 14 forms a back-side exterior of the liquid crystal display device 10. The rear cabinet 14 is formed of a metal such as aluminum similar to the front cabinet 13 and has a horizontally-long substantially shallow-dish-like shape on the whole so as to cover substantially the entire back side of the liquid crystal display device 10 as shown in FIG. 3. The outer surface, which faces the back side, of the rear cabinet 14 is exposed to the outside at the back side of the liquid crystal display device 10 and forms a rear surface of the liquid crystal display device 10. As shown in FIGS. 5 and 6, the rear cabinet 14 includes a bottom plate 14A that has a horizontally-long plate-like shape, step portions 14B that protrude in a step-like shape from both long-side edges of the bottom plate 14A toward the back side and extending portions 14C that extend from the outer edges of the step portions 14B toward the outside and are closer to the front side than the bottom plate 14A.

The bottom plate 14A and the step portions 14B of the rear cabinet 14 are arranged in a state where prescribed gaps are provided between a chassis 16 and heat-dissipating members 26 that constitute part of the back side of the backlight device 12, which will be described later. The extending portions 14C of the rear cabinet 14 extend toward the outside up to positions that overlap the screw attachment portions of the front cabinet. Substantially the entirety of the surfaces of the extending portions 14C are in surface contact with an outer frame-shaped portion 15C of the frame 15, which will be described later. Rear cabinet screw holes 14C1 that can allow the above-described screw members SM to be inserted thereinto are formed in the extending portions 14C and the screw members SM are fitted from the outside.

Next, the backlight device 12 will be described. As shown in FIG. 4, the main constituent components of the backlight device 12 are housed in a space between the frame (example of frame-shaped member) 15 forming the exterior of the front side and the chassis 16 forming the exterior of the back side. The main constituent components housed between the frame 15 and the chassis 16 include at least optical sheets 18, a light guide plate 20, a reflective sheet 22 and LED units LU. Among these components, the liquid crystal panel 11 and the optical sheets 18 are held so as to be stacked on top one another and sandwiched between the front cabinet 13 and the frame 15. The light guide plate 20 is held so as to be sandwiched between the frame 15 and the chassis 16. The light guide plate 20 is interposed between the pair of LED units LU of the backlight device 12 on the two sides in the short-side direction (Y axis direction) inside the frame 15 and the chassis 16. Hereafter, each constituent component will be described.

First, the configurations of the light guide plate 20, the reflective sheet 22, the chassis 16, the LED units LU and the optical sheets 18 will be described. The light guide plate 20 is composed of a synthetic resin material (for example, an acrylic resin such as PMMA or a polycarbonate) having a refractive index that is sufficiently higher than that of air and that is almost completely transparent (excellent transparency). As shown in FIG. 4, the light guide plate 20 has a horizontally-long quadrangular shape in a plan view similar to the liquid crystal panel 11 and the optical sheets 18, which will be described later. The long-side direction of the surface of the light guide plate 20 corresponds to the X axis direction, the short-side direction corresponds to the Y axis direction and the plate thickness direction orthogonally intersecting the surface corresponds to the Z axis direction. The light guide plate 20 is arranged so as to oppose the back side of the optical sheets 18 with a prescribed gap therebetween. The side faces on the long sides of the light guide plate 20 are light-entering faces 20A that receive the light emitted from the LEDs 24.

The light guide plate 20, as shown in FIGS. 4 and 5, is arranged such that the pair of light-entering faces 20A face the LED units LU, a light-exiting surface 20B, which is a main surface (front surface), faces the optical sheets 18, and an opposite surface 20C, which is a surface (back surface) on the opposite side to the light-exiting surface 20B, faces the reflective sheet 22. The light guide plate 20 is supported by the chassis 16, which will be described later, with the reflective sheet 22 therebetween. That is, the direction in which the light guide plate 20 is lined up with the LED units LU corresponds to the Y axis direction and the direction in which the light guide plate 20 is lined up with the optical sheets 18 and the reflective sheet 22 corresponds to the Z axis direction. In addition to receiving light emitted from the LED units LU along the Y axis direction from the light-entering faces 20A, the light guide plate 20 has a function of causing the light to be directed upward toward the optical sheets 18 after propagating inside the light guide plate 20 and then exit the light-exiting surface 20B.

The reflective sheet 22 has a rectangular sheet-like shape, is made of a synthetic resin and a surface thereof is a white color with excellent optical reflectivity. The long-side direction of the reflective sheet 22 corresponds to the X axis direction, the short-side direction of the reflective sheet 22 corresponds to the Y axis direction, and the reflective sheet 22 is arranged so as to be sandwiched between the opposite surface 20C of the light guide plate 20 and the chassis 16 (refer to FIGS. 3 and 5). The front side of the reflective sheet 22 has a reflective surface, and this reflective surface contacts the opposite surface 20C of the light guide plate 20. The reflective sheet 22 can reflect light that has leaked from the LED units LU or light guide plate 20 toward the reflective surface of the reflective sheet 22. In addition, the reflective sheet 22 is slightly larger than the opposite surface 20C of the light guide plate 20 and, as shown in FIG. 6, the edges of the reflective sheet 22 protrude slightly beyond the edges of the light guide plate 20.

As shown in FIG. 4, the LED units LU are respectively arranged along the long sides of the light guide plate 20 and a long-side dimension of the LED units LU is substantially the same as a long-side dimension of the light guide plate 20. Each LED unit LU includes LEDs 24, an LED substrate 25 and a heat-dissipating member 26. The LEDs 24 of the LED units LU each have a configuration in which an LED chip (not shown) is sealed by a resin material on a substrate portion fixed to the LED substrate 25. Each LED chip mounted on the substrate portion has one main emission wavelength and specifically an LED chip is used that performs single color emission of blue light. However, a phosphor that emits light of a prescribed color when excited by the blue light emitted from the LED chip is dispersed and mixed into the resin material in which the LED chip is sealed and consequently the structure as a whole emits substantially white light. For the phosphor, a yellow phosphor that emits yellow light, a green phosphor that emits green light, and a red phosphor that emits red light can be combined appropriately for use, or only one of the phosphors can be used, for example. The LEDs 24 are so-called top emission type LEDs in which a surface that is on the opposite side to a mounting surface for the LED substrate 25 is a main light-emitting surface (the surface facing the light-entering face 20A of the light guide plate 20).

As shown in FIG. 4, the LED substrate 25 of the LED unit LU has the shape of a long narrow plate that extends along the long-side direction of the light guide plate 20 (X axis direction) and is arranged such that the surface thereof is parallel to the X axis direction and the Z axis direction, or in other words parallel to the light-entering face 20A of the light guide plate 20. The dimension in the long-side direction (X axis direction) of the LED substrate 25 is substantially the same as the dimension in the long-side direction (X axis direction) of the light guide plate 20. The thus-configured LEDs 24 are surface mounted on the inner surface of the LED substrate 25, or in other words, the surface facing the light guide plate 20, and this surface is a mounting surface. A plurality of the LEDs 24 are arranged in a line in a single row (linearly) with there being prescribed gaps therebetween in the length direction of the LED substrate 25 (X axis direction) on the mounting surface of the LED substrate 25. That is, a plurality of LEDs 24 are arranged in a line with gaps therebetween along the length direction on both long-side edges of the backlight device 12. The gaps between adjacent LEDs 24 in the X axis direction, that is, the arrangement pitch of the LEDs 24, are substantially uniform. In addition, the alignment direction of the LEDs 24 corresponds to the long-side direction of the LED substrate 25 (X axis direction). A wiring pattern (not shown) formed of a metal film (copper foil, for example) is formed on the mounting surface of the LED substrate 25. The wiring pattern extends along the X axis direction and goes across the group of LEDs 24 connecting the adjacent LEDs 24 in series. By connecting terminals formed at the ends of the wiring pattern to a power supply board (not shown) via a wiring member such as a connector or a cable, driving power is supplied to each of the LEDs 24. The LED substrate 25 is attached to the heat-dissipating member 26, which will be described next.

The heat-dissipating member 26 of the LED unit LU is formed of a metal having excellent thermal conductivity such as aluminum. As shown in FIG. 6, the heat-dissipating member 26 includes a heat-dissipating portion 26A, an upright portion 26B that stands upright from one end of the heat-dissipating portion, and a protruding portion 26C that protrudes from a position approximately in the middle in a short-side direction of the heat-dissipating portion 26A, these portions forming a substantially L-shaped bent shape in a cross sectional view. A long-side dimension of the heat-dissipating member 26 is substantially the same as the long-side dimension of the LED substrate 25. The heat-dissipating portion 26A of the heat-dissipating member 26 has a plate-like shape that extends parallel to a plate-shaped portion 16A of the chassis 16 and a long-side direction of the heat-dissipating portion 26A corresponds to the Y axis direction, a short-side direction thereof corresponds to the X axis direction and a thickness direction thereof corresponds to the Z axis direction. The heat-dissipating portion 26A is arranged on the opposite side to the frame 15 with the LEDs 24 interposed therebetween. The heat-dissipating portion 26A extends so as to protrude toward the inside in the Y axis direction from the back-side edge of the upright portion 26B, that is, toward the center of the light guide plate 20, and a distal edge thereof on the inner side protrudes in a step-like shape toward the light guide plate 20 and abuts against the back surface of the chassis 16. The entirety of heat-dissipating portion 26A opposes the rear cabinet 14 with a prescribed gap therebetween. Consequently, heat transferred to the heat-dissipating member 26 from the LEDs 24 is effectively radiated toward the rear cabinet 14 from the heat-dissipating portion 26A.

As shown in FIG. 6, the upright portion 26B of the heat-dissipating member 26 stands perpendicularly upright with respect to the heat-dissipating portion 26A from an outer (on opposite side to light guide plate 20) edge of the heat-dissipating portion 26A. The upright portion 26B has a plate-like shape that extends parallel to the surface of the LED substrate 25 and the light-entering face 20A of the light guide plate 20. A long-side direction of the upright portion 26B corresponds to the X axis direction, a short-side direction thereof corresponds to the Z axis direction and a thickness direction thereof corresponds to the Y axis direction. The LED substrate 25 is attached with screws or the like, not shown, to an inner surface of the upright portion 26B, that is, a surface of the upright portion 26B that faces the light guide plate 20. An outer surface of the upright portion 26B is attached with screws to the extending portion 14C of the rear cabinet 14 and a connecting portion 15B of the frame 15, which will be described later, and the heat-dissipating member 26 is thus held in place. The protruding portion 26C of the heat-dissipating member 26 protrudes a little from substantially the center of the heat-dissipating portion 26A, in the direction in which the heat-dissipating portion 26A extends (Y axis direction), toward the light guide plate 20 and abuts against a bent portion 16B of the chassis 16, which will be described later. The direction in which the protruding portion 26C protrudes corresponds to the Z axis direction.

The chassis 16 is formed of a metal such as aluminum. The chassis 16 includes the plate-shaped portion 16A, which has the shape of a horizontally-long flat plate on the whole that covers substantially the entirety of the light guide plate 20 and the reflective sheet 22 from the back side, and the bent portions 16B that extend from both long-side edges of the plate-shaped portion 16A and bend toward the back side. The plate-shaped portion 16A of the chassis 16 surface contacts substantially the entirety of the reflective sheet 22, and the light guide plate 20 and the reflective sheet 22 are interposed between the plate-shaped portion 16A and an inner frame-shaped portion 15A of the frame 15, which will be described later. The direction in which the bent portions 16B extend corresponds to the Z axis direction. The inner surfaces of the bent portions 16B abut against the protruding portions 26C of the heat-dissipating members 26 and are fixed to the protruding portions 26C with screws or the like, which are not shown. Thus, the light guide plate 20 and the chassis 16 are supported by the heat-dissipating members 26.

As shown in FIG. 4, the optical sheets 18 have a horizontally long quadrangular shape in a plan view similar to the liquid crystal panel 11 and the dimensions thereof in a plan view (short-side dimension and long-side dimension) are slightly smaller than those of the liquid crystal panel 11. As shown in FIG. 5, the optical sheets 18 are arranged so as to be stacked on the back side of the liquid crystal panel 11 and are arranged so as to be spaced apart from the light-exiting surface 20B of the light guide plate 20. The optical sheets 18 are three sheet members, which each have the shape of a sheet, stacked on top of one another. Examples of specific types of optical sheets 18 include diffusion sheets, lens sheets, reflective polarizing sheets and so on, and the optical sheets 18 to be used can be appropriately selected from among such sheets. The optical sheets 18 are arranged so as to be interposed between the liquid crystal panel 11 and the light guide plate 20, and as a result the optical sheets 18 cause light exiting the light guide plate 20 to be transmitted therethrough and cause the light to exit toward the liquid crystal panel 11 while applying a certain optical effect such as a convergence effect to the transmitted light. As shown in FIG. 6, the optical sheets 18 are arranged such that the outer peripheries thereof overlap a sheet receiving portion 15A3 of the inner frame-shaped portion 15A of the frame 15, which will be described later, and the optical sheets 18 are thereby supported by the sheet receiving portion 15A3 with a cushioning member 28D therebetween. A plurality of tab portions 18A are provided at the edges of the optical sheets, the tab portions 18A each extending from part of the optical sheet toward the outside (refer to FIG. 4). An opening is provided in each tab portion 18A and claw-shaped portions 15E of the frame 15, which will be described later, are inserted into the insides of the openings, whereby the optical sheets 18 are engaged with the frame 15.

Next, the frame 15 will be described in detail. As shown in FIG. 4, the frame 15 is formed in a horizontally-long frame-like shape overall, similar to the front cabinet 13, and is formed of a synthetic resin. In addition, the surface of the frame 15 is a white color and therefore has optical reflectivity. The frame 15 includes the inner frame-shaped portion 15A that is arranged so as to be interposed between the optical sheets 18 and the light guide plate 20, the outer frame-shaped portion 15C that is arranged so as to be interposed between the front cabinet 13 and the rear cabinet 14, the connecting portion 15B that connects the inner frame-shaped portion 15A and the outer frame-shaped portion 15C to each other, and a cabinet-supporting portion 15D that supports the front cabinet 13 from the back side.

The outer frame-shaped portion 15C of the frame 15 is arranged at substantially the same height (position in Z axis direction) as the opposite surface 20C of the light guide plate 20 at a position that is closer to the back side than the inner frame-shaped portion 15A. Frame screw holes 15C1, into which the screw members SM can be inserted, are formed in the outer frame-shaped portion 15C. The screw members SM are inserted into the frame screw holes 15C1 in a state where the outer frame-shaped portion 15C is interposed between the screw attachment portion 13C of the front cabinet 13 and the extending portions 14C of the rear cabinet 14, and thereby the outer frame-shaped portion 15C is screwed and fixed to the front cabinet 13 and the rear cabinet 14. The connecting portion 15B of the frame 15 is formed so as to connect an inner edge of the outer frame-shaped portion 15C and an outer edge of the inner frame-shaped portion 15A to each other and stands upright along the Z axis direction. The cabinet-supporting portion 15D of the frame 15 protrudes toward the front side from the outer edge of the inner frame-shaped portion 15A and abuts against a back-side surface of the front cabinet 13, and is thereby able to mechanically support and reinforce the front cabinet 13.

The inner frame-shaped portion 15A of the frame 15 includes an outer part that forms the outside of the inner frame-shaped portion 15A and an inner part that protrudes in a step-like manner toward the back side from the outer part and forms the inside of the inner frame-shaped portion 15A. The inner part is provided with a pressing portion 15A2 that presses, from the front side, substantially the entire edge of the light-exiting surface of the light guide plate 20; and an exposed portion 15A1 that is positioned closer to the inside than the pressing portion 15A2 and includes an exposed surface 17 that is exposed to the light-exiting surface 20B side of the light guide plate 20. The surface of the outer part of the inner frame-shaped portion 15A serves as a panel-supporting surface that receives the outer periphery of the liquid crystal panel 11 and thereby supports the liquid crystal panel 11. On the other hand, the inner part of the inner frame-shaped portion 15A receives the optical sheets 18 on the sheet-receiving portion 15A3 thereof that extends across the upper surface of the pressing portion 15A2 and the upper surface of the exposed portion 15A1 and thereby supports the optical sheets 18. In other words, the inner frame-shaped portion 15A supports substantially the entire outer peripheries of the liquid crystal panel 11 and the optical sheets 18 from the back side. Cushioning members 28B, 28C and 28D are respectively interposed between the liquid crystal panel 11 and the panel-supporting surface of the inner frame-shaped portion 15A, between the optical sheets 18 and the sheet-receiving portion 15A3 of the inner frame-shaped portion 15A, and between the edge of the light-exiting surface 20B of the light guide plate 20 and the pressing portion 15A2 of the inner frame-shaped portion 15A.

Figure 7:
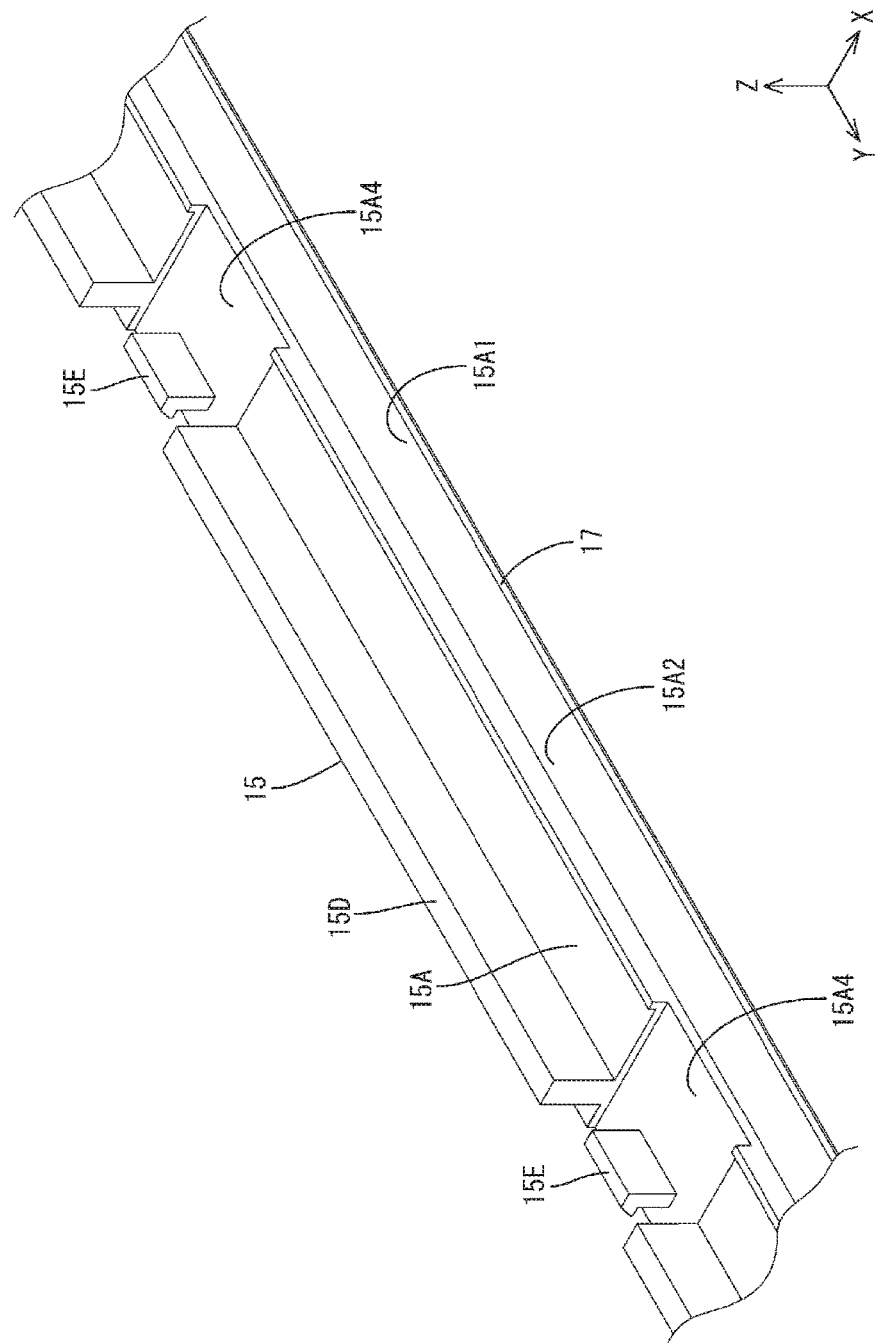
FIG. 7 is an enlarged perspective view in which part of a frame is enlarged.

As shown in FIG. 7, tab-portion-supporting portions 15A4 of the inner frame-shaped portion 15A are provided at positions that are superimposed with the tab portions 18A of the optical sheets 18 described above and the tab-portion-supporting portions 15A4 support the tab portions 18A from the back side. The claw-shaped portions 15E that protrude toward the front side are provided on the tab-portion-supporting portions 15A4. The distal ends of the claw-shaped portions have a shape that protrudes slightly in a claw-like shape toward the outside. The claw-shaped portions 15E are inserted into the openings provided in the tab portions 18A of the optical sheets 18, thereby locking the tab portions 18A to the claw-shaped portions 15E. In addition, in this locked state, the claw-shaped portions 15E abut against the edges of the openings provided in the tab portions 18A, and the optical sheets 18 are thereby positioned in the sheet surface direction (X-Y plane direction).

In the backlight device 12 of this embodiment, the width of a region outside the display region AA, that is, the width of the frame portion (Y axis direction dimension or X axis direction dimension), is narrow, and therefore frame narrowing has been achieved. Consequently, as shown in FIG. 6, the inner distal edge of the exposed portion 15A1 of the inner frame-shaped portion 15A protrudes into the display region AA. The exposed surface 17 of the exposed portion 15A1 is an inclined surface that is oriented toward the light-exiting surface 20B. In more detail, the exposed surface 17 is a flat inclined surface that is inclined from the inner side to the outer side thereof toward the front side. Thus, the exposed portion 15A1 becomes thicker from the inner side to the outer side thereof. Therefore, as shown in FIG. 7, the exposed surface 17 of the exposed portion 15A1 is hidden when the frame 15 is viewed from the front side. In addition, the inner distal edge of the inclined exposed surface 17 is close to the back side of the optical sheets 18 and the outer distal edge of the exposed surface 17 is close to the light-exiting surface 20B of the light guide plate 20. The inclined surface provided on the exposed portion 15A1 is formed along the entire length of the frame-shaped exposed portion 15A.

As a result of the exposed portion 15A1 of the inner frame-shaped portion 15A of the frame 15 having the above-described configuration and shape, light that heads toward the exposed portion 15A1 out of light that has exited the light-exiting surface 20B of the light guide plate 20 travels along the following path. That is, light that heads toward the exposed portion 15A1 hits and is reflected by the exposed surface 17, which has optical reflectivity and is an inclined surface. The majority of the light reflected at this time is oriented so as to head toward the center of the light-exiting surface 20B of the light guide plate 20, which is on the opposite side to the optical sheets 18 and the liquid crystal panel 11 (refer to alternate long and short dash arrows in FIG. 6). That is, the majority of the light scattered as a result of hitting the part of the frame 15 that protrudes toward the display region AA out of the light that has exited the light-exiting surface 20B of the light guide plate 20 heads away from the optical sheets 18 and the liquid crystal panel 11. Consequently, the generation of bright spots or shadows on the display surface 11C of the liquid crystal panel 11 caused by such scattered light is prevented or suppressed.

In the backlight device 12 of this embodiment described above, the frame region has been made narrow and as a result the exposed portion 15A1 of the frame 15 protrudes toward the display region AA of the display surface 11C of the liquid crystal panel 11 and overlaps the display region AA. Consequently, with the conventional configuration of the frame 15, there is a risk of light that has exited the light-exiting surface 20B being blocked by the exposed surface 17 of the exposed portion 15A1 and a shadow being formed on the display surface 11C of the liquid crystal panel 11 or of the light being scattered by the exposed surface 17 and bright spots being formed on the display surface 11C of the liquid crystal panel 11. In contrast, in the backlight device 12 of this embodiment, at least part of the exposed surface of the exposed portion that overlaps the display region AA has optical reflectivity and therefore blocking of light that has exited the light-exiting surface by the exposed surface can be prevented even though the frame region has been made narrow. In addition, since the exposed surface 17 is an inclined surface that is oriented toward the light-exiting surface 20B, the majority of light that is scattered by the exposed surface 17 heads away from display surface 11C of the liquid crystal panel 11 and toward the center of the light-exiting surface 20B and generation of bright spots on the display surface 11C of the liquid crystal panel 11 can be prevented or suppressed even though the frame region has been made narrow. In the backlight device 12 of this embodiment described above, generation of shadows and bright spots on the display surface 11C of the liquid crystal panel 11 can be prevented or suppressed while making the frame region narrow.

In addition, in this embodiment, the surface of the exposed portion 15A1 of the frame 15 on the opposite side to the exposed surface 17 is a sheet-supporting surface that supports the edges of the optical sheets 18. By adopting this configuration, the frame 15 can be made to also serve as a member for supporting the optical sheets 18. Furthermore, the light guide plate 20 and the optical sheets 18 are separated from each other as a result of the frame 15 being interposed between the light guide plate 20 and the optical sheets 18, and therefore light that has exited the light-exiting surface 20B can be allowed to diffuse before reaching the optical sheets 18 and the brightness distribution of the light can be improved.

In this embodiment, the LEDs 24 are arranged so as to face the light-entering faces 20A of the light guide plate 20 and the frame 15 is arranged such that a part of the frame 15 that is closer to the inside of the frame 15 than the pressing portion covers the gap between the LEDs 24 and the light-entering faces 20A from the light-exiting surface 20B side. By adopting this configuration, light from the LEDs 24 can be prevented from leaking toward the display surface 11C side of the liquid crystal panel 11 without being guided by the light guide plate 20.

Furthermore, in this embodiment, the exposed surface 17 of the exposed portion 15A1 is an inclined surface at at least parts thereof where the exposed surface 17 is provided closer to the inside than the pressing portion 15A2 that presses the edges of the light-exiting surface 20B positioned on the light-entering face 20A sides among the edges of the light-exiting surface 20B. Here, most of the light exits the light-exiting surface 20B from the portions of the light-exiting surface 20B close to the light-entering faces 20A. Therefore, a greater amount of light exits at the edges of the light-exiting surface 20B positioned on light-entering face 20A sides among the edges of the light-exiting surface 20B than at the edges not positioned on light-entering face 20A sides. Consequently, according to this embodiment, generation of shadows or bright spots on the display surface 11C of the liquid crystal panel 11 can be effectively prevented or suppressed.

In addition, in this embodiment, the exposed portion 15A1 is arranged such that only an inner distal edge thereof protrudes into the display region AA of the display surface 11C of the liquid crystal panel 11. As a result of adopting this configuration, the width of a part (the inner distal edge in this embodiment) that protrudes into the display region AA of the inner frame-shaped portion 15A of the frame 15 when the frame region of the liquid crystal display device 10 has been made narrow is smaller than that in the configuration where a conventional frame is used. Accordingly, it is less likely that the protruding part will cast a shadow compared with the conventional configuration when the display region AA is viewed obliquely.

In addition, in this embodiment, the frame 15 includes a panel-supporting portion that has a panel-supporting surface that supports the liquid crystal panel 11. Therefore, the frame 15 can be made to also serve as a member for supporting the liquid crystal panel 11.

Modification Example 1 of Embodiment 1

Figure 8:
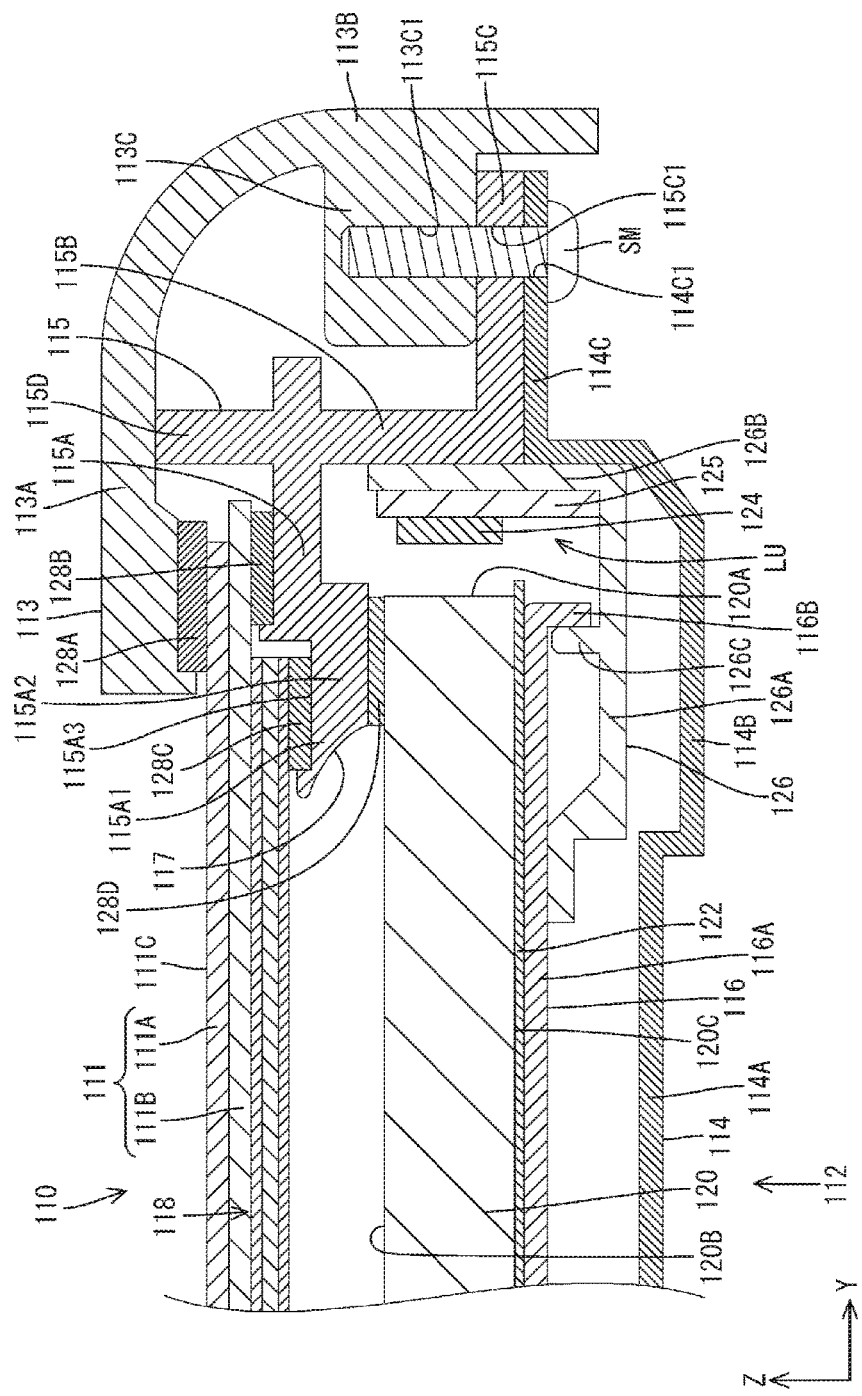
FIG. 8 is an enlarged cross-sectional view in which an important part of a liquid crystal display device according to Modification Example 1 of Embodiment 1 is enlarged.

Next, Modification Example 1 of Embodiment 1 will be described while referring to FIG. 8. Portions in FIG. 8 are the same as portions in FIG. 6 with 100 added to the respective reference symbols. Modification Example 1 differs from Embodiment 1 in terms of the shape of an exposed surface 117 of an exposed portion 115A1 of a frame 115. That is, in Modification Example 1, as shown in FIG. 8, the exposed surface 117 of the exposed portion 115A1 of the frame 115 is an inclined surface having a curved shape that is recessed toward the inside of the exposed portion 115A1 and optical sheets 118. By forming the exposed surface 117 in this way, compared with the case where the exposed surface 117 is a flat inclined surface, the part of the exposed surface 117 located on the front side (side close to optical sheets 118) faces a light-exiting surface 120B in a close to parallel state and therefore light that is scattered by the exposed surface 117 can be directed more toward a light-exiting surface 120B side.

Modification Example 2 of Embodiment 1

Figure 9:
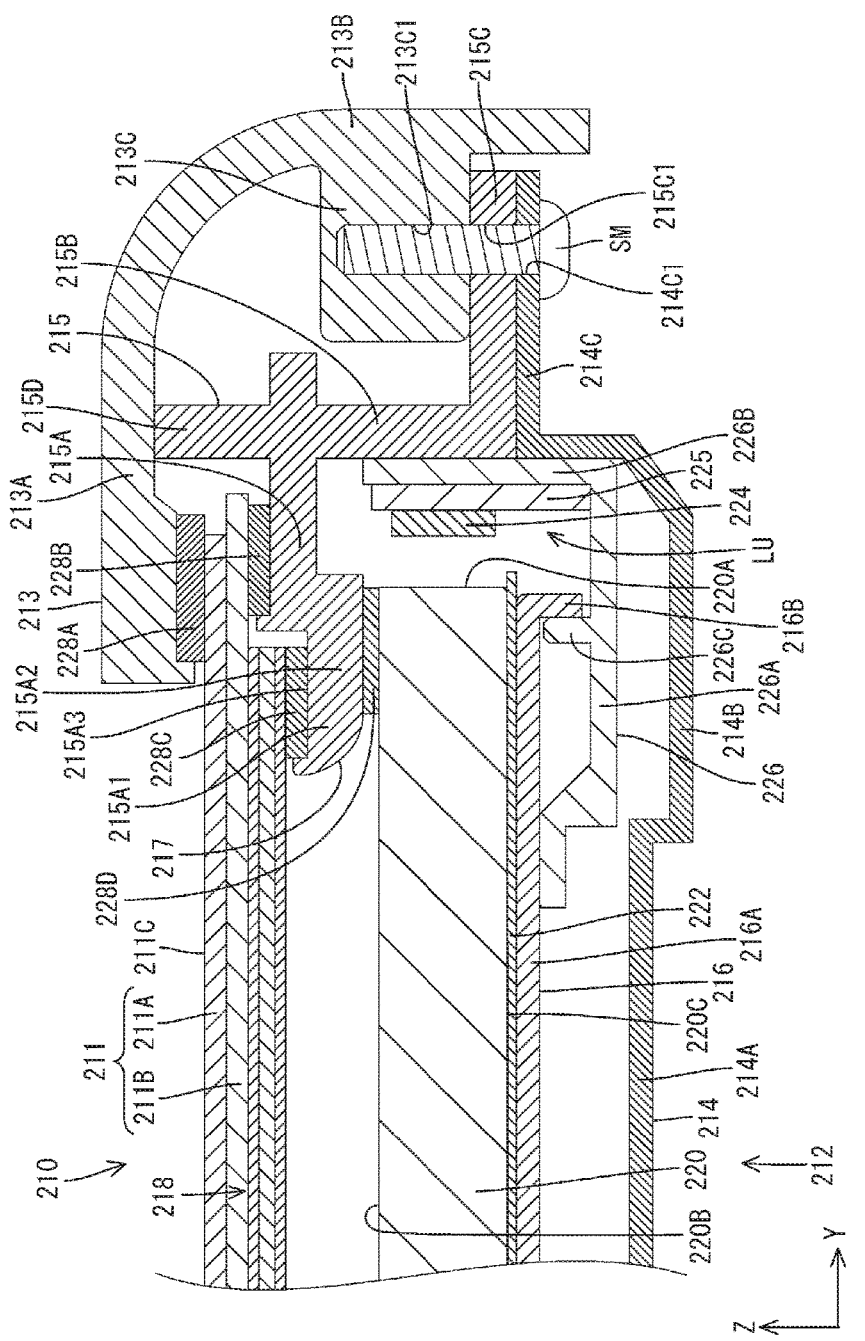
FIG. 9 is an enlarged cross-sectional view in which an important part of a liquid crystal display device according to Modification Example 2 of Embodiment 1 is enlarged.

Next, Modification Example 2 of Embodiment 1 will be described while referring to FIG. 9. Portions in FIG. 9 are the same as portions in FIG. 6 with 200 added to the respective reference symbols. Modification Example 2 differs from Embodiment 1 in terms of the shape of an exposed surface 217 of an exposed portion 215A1 of a frame 215. That is, in Modification Example 2, as shown in FIG. 9, the exposed surface 217 of the exposed portion 215A1 of the frame 215 is an inclined surface having a curved shape that bulges out toward a region outside the exposed portion 215A1 and toward the light-exiting surface. By forming the exposed surface 217 in this way, compared with the case where the exposed surface 217 is a flat inclined surface, the part of the exposed surface 217 located on the back side (side close to light-exiting surface 220B) faces the light-exiting surface 220B in a close to parallel state and therefore light that is scattered by the exposed surface 217 can be directed more toward the light-exiting surface 220B side.

Modification Example 3 of Embodiment 1

Figure 10:
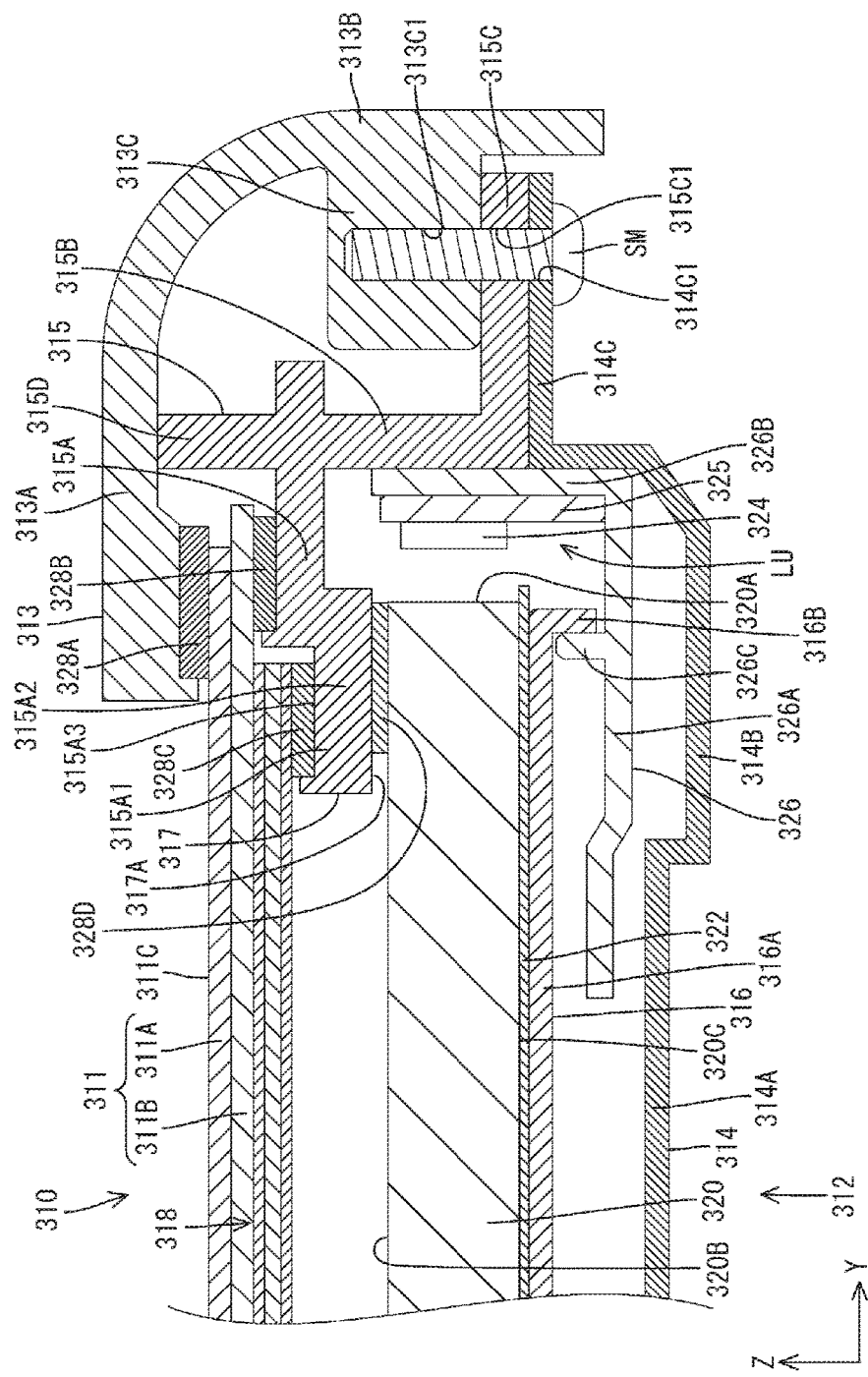
FIG. 10 is an enlarged cross-sectional view in which an important part of a liquid crystal display device according to Modification Example 3 of Embodiment 1 is enlarged.
Figure 11:
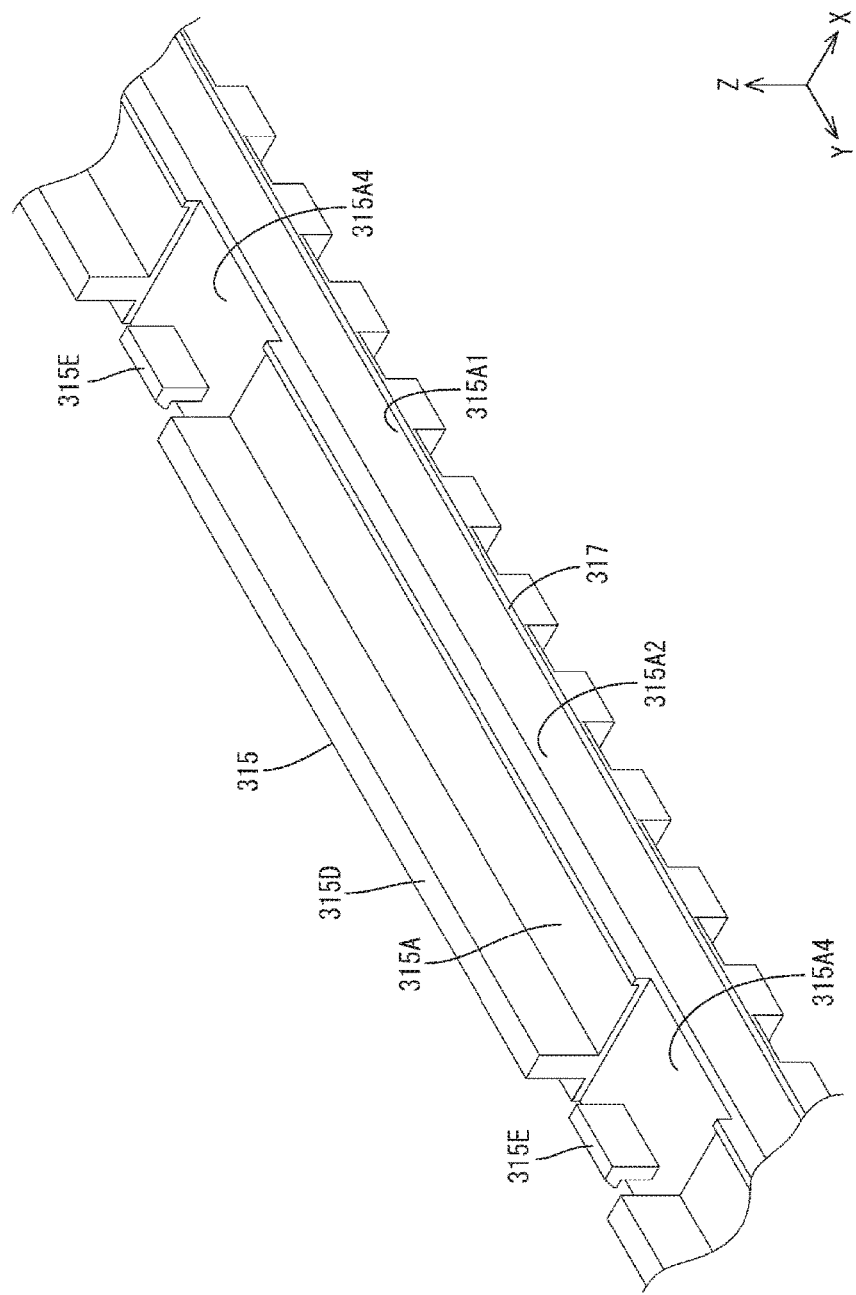
FIG. 11 is an enlarged perspective view in which part of a frame in Modification Example 3 of Embodiment 1 is enlarged.

Next, Modification Example 3 of Embodiment 1 will be described while referring to FIGS. 10 and 11. Portions in FIGS. 10 and 11 are the same as portions in FIGS. 6 and 7 with 300 added to the respective reference symbols. Modification Example 3 differs from Embodiment 1 in terms of the configuration of an exposed portion 315A1 of a frame 315. In this modification example, as shown in FIGS. 10 and 11, rather than the entirety of an exposed surface 317 of the exposed portion 315A1 being an inclined surface, just parts of the exposed surface 317 have an inclined surface. More specifically, as shown in FIG. 11, the exposed portion 315A1 has a configuration in which a portion having an inclined exposed surface 317 and a portion having a non-inclined exposed surface 317, due to the exposed portion 315A1 having a block-like shape, are alternately arranged. The portions having an inclined exposed surface 317 are positioned directly above a plurality of LEDs 324 that are arranged with gaps therebetween. That is, in the exposed portion 315A1, the exposed surface 317 is an inclined surface only in cross sections in which the cross section of an LED 324 appears among cross sections taken along the thickness direction (Z axis direction) of a light guide plate 320. On the other hand, portions where the exposed surface 317 is not inclined are positioned directly above portions between adjacent LEDs 324. That is, in the exposed portion 315A1, the exposed surface 317 is not an inclined surface in cross sections in which the cross section of an LED 324 does not appear among cross sections taken along the thickness direction (Z axis direction) of the light guide plate 320 (refer to FIG. 10).

As shown in FIG. 10, a portion of each of the parts of the exposed surface 317 that are not an inclined surface in the exposed portion 315A1 of the frame 315 presses the edge of the light-exiting surface 320B of the light guide plate 320 from the front side via a cushioning member 328D. In this modification example, the parts of the exposed surface 317 that are not an inclined surface can be made to function as parts that press the edge of the light guide plate 320. Therefore, compared to the case where the entirety of the exposed surface 317 is an inclined surface, the light-exiting surface 320B of the light guide plate 320 can be more easily held in place and the light guide plate 320 can be more stably arranged.

Embodiment 2

Embodiment 2 will be described while referring to the drawings. Embodiment 2 differs from Embodiment 1 in terms of the configuration of a frame 415. The rest of the configuration is the same as that of Embodiment 1 and therefore description of the structure, operation and effect will be omitted. In addition, in FIG. 12, portions that have had 400 added to the corresponding reference symbols in FIG. 6 are the same as the portions described in Embodiment 1.

Figure 12:
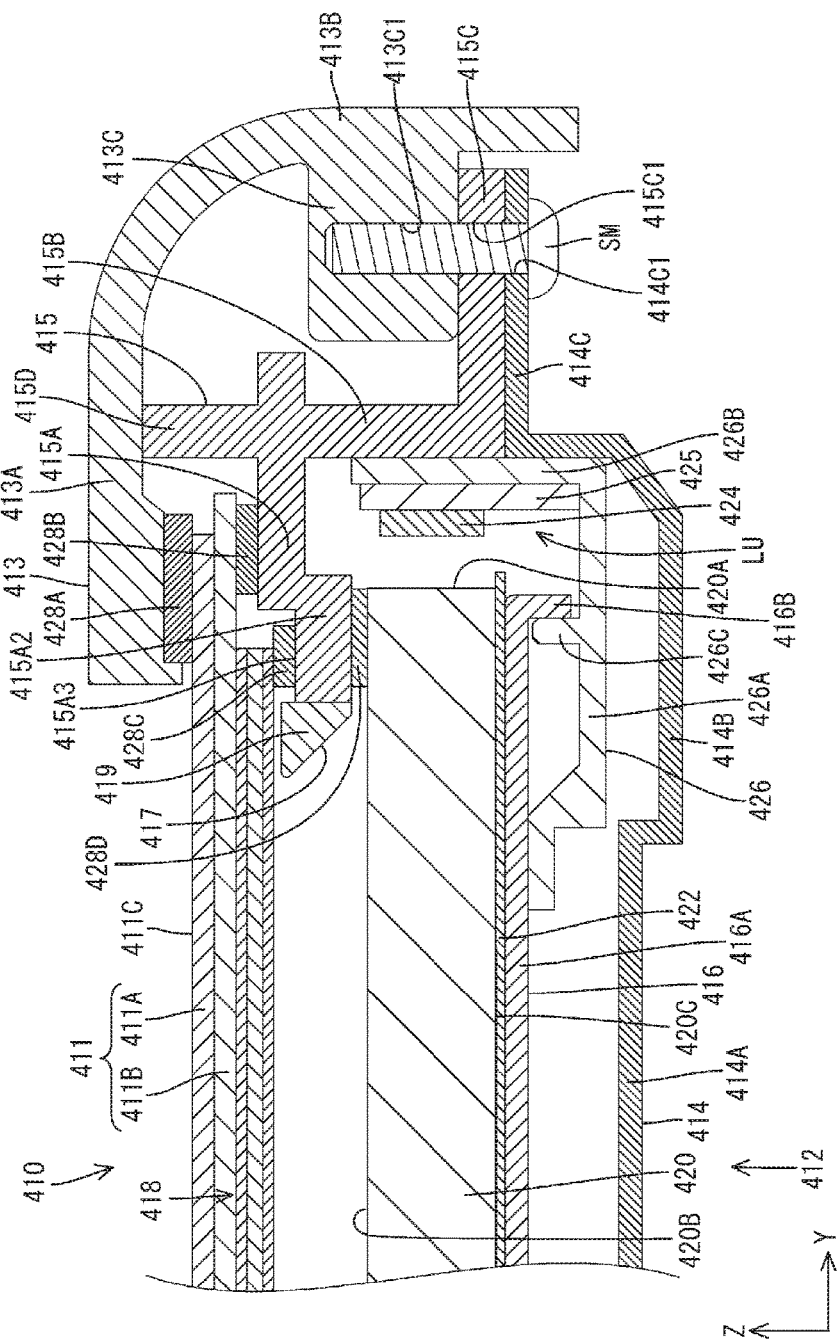
FIG. 12 is an enlarged cross-sectional view in which an important part of a liquid crystal display device according to Embodiment 2 is enlarged.

As shown in FIG. 12, in a backlight device 412 according to Embodiment 2, an exposed member 419, which corresponds to the exposed portion 15A in Embodiment 1, of the frame 415 is a member that is separate from the part of the frame (hereafter, main part) other than the part corresponding to the exposed portion 15A1. The exposed member 419 is freely attachable to a pressing portion 415A2 of the main part. The configuration of the main part to which the exposed member 419 is attached is similar to the configuration of the frame 15 in Embodiment 1. In this embodiment, by adopting this configuration for the frame 415, in the process of manufacturing the backlight device 412, the exposed member 419, which corresponds to the exposed portion, of the frame 415 can be attached as a member separate to the part other than the exposed portion. In addition, the convenience of member replacement can be made high since only the exposed member 419 need be replaced if a defect is found in the exposed surface after the exposed member 419 is attached to the frame 415.

Embodiment 3

Embodiment 3 will be described while referring to the drawings. Embodiment 3 differs from Embodiment 1 in terms of the configuration of a frame 515. The rest of the configuration is the same as that of Embodiment 1 and therefore description of the structure, operation and effect will be omitted. In addition, in FIG. 13, portions that have had 500 added to the corresponding reference symbols in FIG. 6 are the same as the portions described in Embodiment 1.

Figure 13:
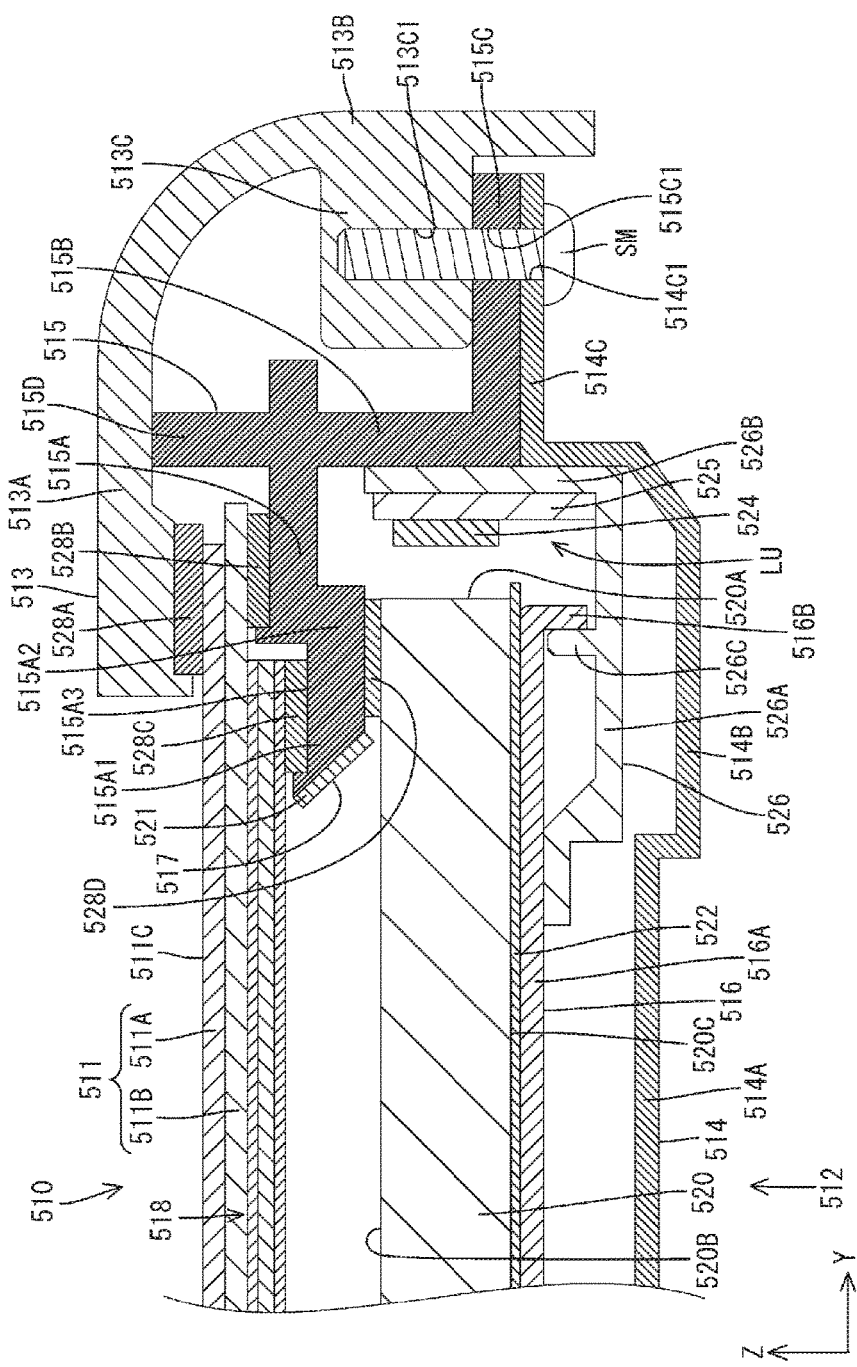
FIG. 13 is an enlarged cross-sectional view in which an important part of a liquid crystal display device according to Embodiment 3 is enlarged.

As shown in FIG. 13, in a backlight device 512 according to Embodiment 3, the entirety of a frame 515 has a light-blocking property. The configuration and shape of the frame 515 are the same as in Embodiment 1. In the frame 515 of this embodiment, a reflective member 521 that has optical reflectivity is adhered to an exposed surface 517 of an exposed portion 515A1 so as to cover the exposed surface 517. The exposed surface 517 to which the reflective member 521 is adhered has a similar function to the exposed surface 17 in Embodiment 1. That is, the majority of the light scattered as a result of hitting the exposed surface 517 to which the reflective member 521 is adhered heads away from optical sheets 518 and a liquid crystal panel 511. Consequently, in this embodiment, generation of shadows and bright spots on a display surface 511C of the liquid crystal panel 511 can be prevented or suppressed while making a frame region of the backlight device 512 narrow. On the other hand, in the backlight device 512 of this embodiment, since the part of the frame 515 other than the exposed surface 517 has a light-blocking property, light from LEDs 524 and a light guide plate 520 can be effectively prevented from leaking to outside the frame 515.

Modification examples of the above-described embodiments are given below.

(1) In the above-described embodiments, examples were described in which an inclined surface at an exposed surface is shaped so as to be inclined from the inner side to the outer side thereof toward the front side, but it is sufficient that the inclined surface be provided so as to face the light-exiting surface and the shape of the inclined surface is not limited.

(2) In the above-described embodiments, a frame was exemplified as the frame-shaped member, but it is sufficient that the frame-shaped member have a pressing portion and an exposed portion and is not limited to being a frame.

(3) In addition to the above-described embodiments, the configuration and shape of the frame can be appropriately changed.

(4) In addition to the above-described embodiments, the shape of the exposed surface of the exposed portion of the frame can be appropriately changed.

(5) In the above-described embodiments, an edge-lit backlight device is exemplified, but the present invention can also be applied to a direct-lit backlight device.

(6) In the above-described embodiments, a liquid crystal display device employing a liquid crystal panel as a display panel is exemplified, but the present invention can also be applied to a display device employing another type of display panel.

(7) In the above-described embodiments, a television receiver equipped with a tuner is exemplified, but the present invention can also be applied to a display device not equipped with a tuner.

Embodiments of the present invention have been described in detail above, but these embodiments are merely illustrative examples and do not limit the scope of the claims. Various modifications and changes to the specific examples exemplified above are included in the technologies described in the claims.

| Description of Reference Characters | |
|---|---|
| TV | television receiver |
| LDU | liquid crystal display unit |
| PWB | power supply board |
| MB | main board |
| CTB | control board |
| CV | cover member |
| ST | stand |
| LU | LED unit |
| 10, 110, 210, 310, 410, 510 | liquid crystal display device |
| 11, 211, 311, 411, 511 | liquid crystal panel |
| 12, 112, 212, 312, 412, 512 | backlight device |
| 13, 113, 213, 313, 413, 513 | front cabinet |
| 14, 114, 214, 314, 414, 514 | rear cabinet |
| 15, 115, 215, 315, 415, 515 | frame |
| 15A, 115A, 215A, 315A, 415A, 515A | inner frame-shaped portion |
| 15A1, 115A1, 215A1, 315A1, 515A1 | exposed portion |
| 15A2, 115A2, 215A2, 315A2, 515A2 | pressing portion |
| 17, 117, 217, 317, 417, 517 | exposed surface |
| 18, 118, 218, 318, 418, 518 | optical sheet |
| 20, 120, 220, 320, 420, 520 | light guide plate |
| 20A, 120A, 220A, 320A, 420A, 520A | light-entering face |
| 20B, 120B, 220B, 320B, 420B, 520B | light-exiting surface |
| 24, 124, 224, 324, 424, 524 | LED |
| 419 | exposed member |
| 521 | reflective member |

What is claimed is:

1. An illumination device, comprising:
    a light source;
    a light guide plate, at least one side face thereof being a light-entering face where light from the light source enters and one surface thereof being a light-exiting surface where light from the light source exits; and
    a frame-shaped member having a frame shape and including a pressing portion extending inwardly in a plan view and pressing an edge of the light-exiting surface of the light guide plate from above in a side view, an end face of the pressing portion facing inwardly and being exposed to the light-exiting surface thereunder,
    wherein at least part of said end face of the pressing portion has light-reflecting characteristics and has an inclined surface directed towards the light-exiting surface.

2. The illumination device according to claim 1, further comprising:
    an optical sheet that exerts an optical effect on light that exits the light-exiting surface of the light guide plate,
    wherein a top surface of the pressing portion supports an edge of the optical sheet.

3. The illumination device according to claim 1, wherein said at least part of said end face of the pressing portion has a curved shape that is recessed towards an inside of the exposed portion.

4. The illumination device according to claim 1, wherein said at least part of said end face of the pressing portion bulges outward from the exposed portion.

5. The illumination device according to claim 1, wherein the pressing portion of the frame-shaped member includes a first member having said end face, and the first member is attached to a remaining structure of the frame-shaped member.

6. The illumination device according to claim 1,
wherein the pressing portion of the frame-shaped member includes a reflective member that has light-reflective characteristics and that is attached to a remaining structure of the frame shaped member, said remaining structure of the frame shaped member being made of a material having light-shielding characteristics.

7. The illumination device according to claim 1, wherein, in said end face of the pressing portion, said at least part of said end face having the inclined surface is located in a position corresponding to said light source.

8. The illumination device according to claim 1, wherein said edge of the light-exiting surface that is pressed by the pressing portion of the frame-shaped member is at a side of the light-entering face of the light guide plate.

9. The illumination device according to claim 1, wherein said end face of the pressing portion is colored white.

10. The illumination device according to claim 1,
wherein the light source is arranged so as to face the light-entering face of the light guide plate, and
wherein the frame-shaped member is arranged such that a part of the frame-shaped member from which the pressing portion extends inwardly covers a gap between the light source and the light-entering face from above.

11. A display device comprising:
the illumination device according to claim 1; and
a display panel that performs display utilizing light from the illumination device.

12. The display device according to claim 11, wherein only a part of said inclined surface at the end face of the pressing portion protrudes toward a display region of the display panel in a plan view.

13. The display device according to claim 11, wherein the frame-shaped member includes a panel-supporting portion having a panel-supporting surface that supports the display panel.

14. The display device according to claim 11, wherein the display panel is a liquid crystal panel using liquid crystal.

15. A television receiver comprising:
the display device according to claim 11; and
a television tuner connected to the display device.

* * * * *